United States Patent
Hebert

(10) Patent No.: US 6,635,325 B1
(45) Date of Patent: Oct. 21, 2003

(54) PARISON WHOSE NECK IS BASED ON AN AROMATIC POLYESTER, AND IN PARTICULAR ON PET, THE NECK INCLUDING A THREAD HAVING A PROFILE IN LONGITUDINAL SECTION THAT IS ASYMMETRICAL

(75) Inventor: Roland Hebert, Ann Arbor, MI (US)

(73) Assignee: Schmalbach-Lubeca AG (DE)

( * ) Notice: Subject to any disclaimer, the term of this patent is extended or adjusted under 35 U.S.C. 154(b) by 0 days.

(21) Appl. No.: 09/530,226

(22) PCT Filed: Oct. 21, 1998

(86) PCT No.: PCT/EP98/06664

§ 371 (c)(1),
(2), (4) Date: Apr. 25, 2000

(87) PCT Pub. No.: WO99/22928

PCT Pub. Date: May 14, 1999

(30) Foreign Application Priority Data

Oct. 31, 1997 (FR) .............................................. 97 13928

(51) Int. Cl.$^7$ .................................................. D02G 3/00
(52) U.S. Cl. .................................. 428/36.91; 428/542.8
(58) Field of Search ......................... 428/542.8, 36.91, 428/35.7; 264/523, 532, 521, 535, 908; 220/675, 296; 215/42, 40, 44

(56) References Cited

U.S. PATENT DOCUMENTS

| | | | | |
|---|---|---|---|---|
| 3,881,622 A | * | 5/1975 | Dockery | 215/44 |
| 4,212,841 A | * | 7/1980 | Michel | 264/530 |
| 4,928,835 A | * | 5/1990 | Collette et al. | 428/524.8 |
| 5,067,622 A | * | 11/1991 | Garver et al. | 215/381 |
| 5,431,291 A | * | 7/1995 | LaBombarbe, Jr. | 215/44 |
| 5,660,905 A | * | 8/1997 | Mero et al. | 428/36.92 |
| 5,678,711 A | * | 10/1997 | Tobias | 215/42 |

* cited by examiner

Primary Examiner—Kenneth R. Rice
(74) Attorney, Agent, or Firm—Harness, Dickey & Pierce, P.L.C.

(57) ABSTRACT

The parison (1) is made from one or more thermoplastic resins, and includes a neck (2) based on an aromatic polyester and preferably based on PET, which neck is provided with a thread and is not thermally stabilized. The thread has a profile in longitudinal section that is asymmetrical, making it possible to obtain a thread whose profile in longitudinal section is of improved symmetry after the neck (2) has been thermally stabilized. A receptacle, and in particular a bottle, is obtained by stretching and blowing a parison, and in which at least the neck (2) has been thermally stabilized, and has preferably been completely crystallized.

16 Claims, 2 Drawing Sheets

PARISON WHOSE NECK IS BASED ON AN AROMATIC POLYESTER, AND IN PARTICULAR ON PET, THE NECK INCLUDING A THREAD HAVING A PROFILE IN LONGITUDINAL SECTION THAT IS ASYMMETRICAL

BACKGROUND AND SUMMARY OF THE INVENTION

The present invention relates to the field of making hollow articles, and in particular bottles or receptacles, which are obtained by stretching and blowing a parison. The invention relates mainly to improvements to the thread on the neck of a parison based on at least one aromatic polyester resin, and also to a receptacle obtained by stretching and blowing such a parison, with the neck of the receptacle being made stable with respect to heat by being subjected to a thermal stabilization operation. The invention is advantageously applicable in the manufacture of receptacles and in particular bottles made of polyester and in particular of polyethylene terephthalate (PET), which bottles can be filled with a liquid at high temperature; for example, this may relate to receptacles that are filled with a pasteurized beverage while it is at high temperature, or to receptacles that are reusable and that can be washed in hot water.

Most polyester receptacles, and in particular PET-based bottles, are closed by means of a removable cap that can be fitted to the neck of the bottle by being screwed thereon. To this end, the neck of the parison that is subsequently to form the bottle is provided with a thread that matches the inside thread of the closure cap. Industrially speaking, receptacles are closed on a manufacturing line in automatic manner after the receptacles have been filled. Each receptacle is closed by automatically applying a determined amount of tightening torque to the cap while it is on the receptacle.

Obtaining very good sealing of receptacles by means of their caps is a constant concern of manufacturers and of bottlers, particularly when the receptacles are intended to contain an aerated beverage. Any leakage through the cap significantly reduces the lifetime of the beverage inside the receptacle, with the carbon dioxide contained in the beverage escaping more easily and more quickly to the outside while, on the contrary, oxygen penetrates more easily to the inside of the receptacle. To close the receptacle in sealed manner, it is essential for the thread on the neck of the bottle to match as closely as possible the inside thread of the cap. In practice, it is particularly important for the profile, in longitudinal section, of the thread on the receptacle to match the profile of the inside thread of the cap, i.e., given the types of cap presently available on the market, the profile must be symmetrical. The greater the asymmetry in longitudinal section of the profile of the thread, the higher the risk of the sealing via the cap being defective. On the filling line and while the cap is being put into place on the receptacle, there is also a risk that the controlled torque is caused to be wrong so that the cap is not, in fact, tightened sufficiently. For these reasons, manufacturers of receptacles made of polyester, and in particular bottles based on PET, have made use of molds that enable parisons to be made by injection molding in which the thread has a profile in longitudinal section that is as symmetrical as possible.

Another problem with receptacles based on a polyester resin such as PET lies in their poor thermal stability which makes them too easily deformable when exposed to high temperatures, for example when they are filled with a liquid at high temperature such as a pasteurized beverage, or when they are immersed in a hot washing liquid. To mitigate that drawback, a technique commonly used at present is to subject such receptacles during manufacture to an operation referred to as "thermal stabilization" which consists in raising them for a predetermined length of time to a high temperature and in practice to a temperature that is higher than the temperature to which the receptacles might subsequently be subjected in use, and this has the consequence of increasing the degree of crystallinity of the resin by a thermal effect. This operation can be performed on the manufacturing line directly on the parison, or on the final receptacle as obtained after final stretching and blowing of the parisons, or indeed on the article at an intermediate stage between the parison and the finally stretched and blown receptacle. The thermal stabilization can be performed, for example, by passing the articles through a "crystallizing" oven fitted with infrared lamps. In practice, polyester receptacles which are thermally stabilized during manufacture are easily recognized because they are opaque in the neck, due to the increased degree of crystallinity of the resin, and in particular to the increase in the size and number of spherolites in the crystal structure.

Thermally stabilizing the neck of a receptacle made on the basis of at least one polyester resin, and in particular of PET, advantageously serves to reduce very considerably any phenomenon whereby the profile of the thread on the neck of the receptacle deforms in the event of the thread subsequently being exposed to a high temperature, for example by being filled with a hot liquid. Thus, e.g. for the purpose of enabling the receptacle to be reused, it is possible for it to be washed at a higher temperature, and in particular a temperature close to the vitreous transition temperature of the material from which the receptacle is made, while leaving substantially unchanged the degree of sealing that can be obtained at the cap of the receptacle. The drawback is that the operation of thermally stabilizing the receptacle, itself deforms the profile of the thread, thereby reducing the symmetry of the profile compared with the initial profile that the thread had previously at the parison stage on leaving the injection mold. This deformation of the thread under the effect of heat is further increased when the thread is of the discontinuous type, i.e. when it is made up of a succession of segments separated by longitudinal grooves that serve as vents to allow the gas contained in the receptacle to be released progressively when it is opened.

Solutions proposed in the past for mitigating deformation of the thread when the parison or the bottle is subjected to heat treatment have all sought to make the thread better at withstanding deformation under the effect of heat. A solution of that type is proposed, for example, in European patent application EP 0 675 047, which teaches making a PET parison whose neck thread is of the discontinuous type, and in which the grooves between successive segments of the thread are characteristically distributed at regular intervals around the circumference of the neck of the bottle. Nevertheless, that solution suffers from the drawback of very considerably complicating the structure of the mold for injecting the parison, and, in practice, makes the method too difficult to implement.

The invention seeks to propose a novel solution to the problem of the thread on the neck of a parison or of a receptacle becoming deformed, as happens when the neck is based on at least one aromatic polyester resin, and in particular when it is based on PET, and is subjected to an operation of thermal stabilization.

Unlike solutions proposed in the past, the invention consists not in making the thread less deformable when the neck is subjected to an operation of thermal stabilization, but on the contrary in making use of the deformation of the thread under the effect of heat, by anticipating it.

Thus, the invention mainly provides a parison made from one or more thermoplastic resins and including a neck based on an aromatic polyester, which neck is provided with a thread that has not been thermally stabilized. In characteristic manner, the thread has a profile in longitudinal section that is asymmetrical, thereby making it possible to obtain a thread whose profile in longitudinal section presents improved symmetry after the neck has been thermally stabilized.

The invention also provides a receptacle, and in particular a bottle based on PET which can be filled with a hot liquid and, more particularly, which can be reused, the receptacle being obtained by stretching and blowing the above-specified parison, and then subjecting the neck Thereof to thermal stabilization.

BRIEF DESCRIPTION OF THE DRAWINGS

Other characteristics and advantages of the invention appear more clearly on reading the following description of a preferred embodiment, which description is given by way of non-limiting example and is made with reference to the accompanying drawings, in which.

DETAILED DESCRIPTION OF THE PREFERRED EMBODIMENT

Figure 1:
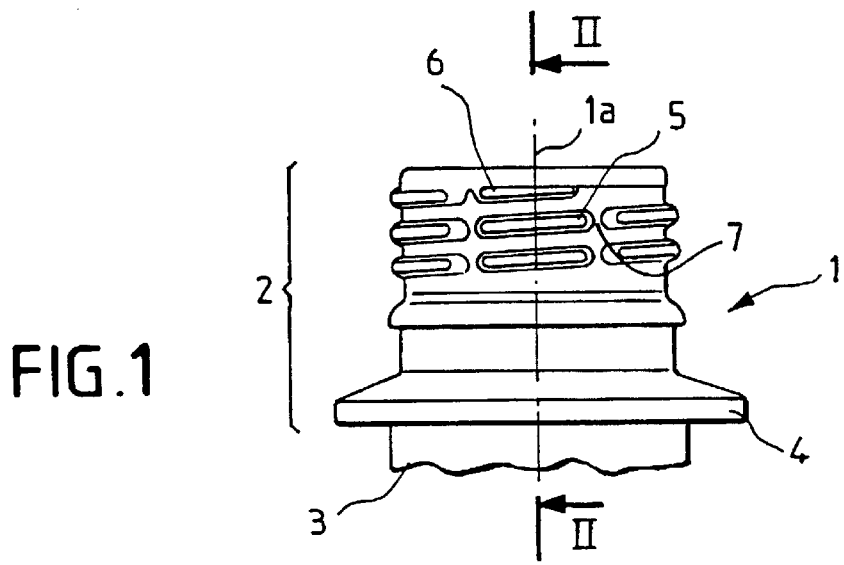
FIG. 1 is a fragmentary side view of the neck of a parison including a discontinuous PCO type thread.

FIG. 1 is a fragmentary side view of a parison 1 that is intended after stretching and blowing while hot to form a receptacle, and in particular a bottle. The parison 1 is essentially tubular in shape about a central longitudinal axis 1a, and it is constituted by a neck 2 and a portion 3 that is intended, after stretching and blowing, to form the body of the bottle. The neck 2 is terminated by a collar 4 of larger diameter, which serves in particular as a bearing surface during the stretching and blowing operations, with only the portion 3 of the parison that is situated beneath said collar 4 being intended for two-directional stretching, both in a direction parallel to the longitudinal axis 1a and in a direction that extends transversely to said axis.

The neck of the parison 1 is provided with a thread that enables a closure cap (not shown) to be screwed thereon, the cap being provided with an inside thread that is designed to co-operate with the thread on the neck 2 of the parison 1. In the particular example shown, the thread on the neck 2 is discontinuous and is in the form of a plurality of segments 5 that are separated by longitudinal grooves 7. These longitudinal grooves 7 serve mainly to enable the gas contained inside the bottle to be released progressively when the closure cap is opened, thereby ensuring that the use is in no danger, during opening, because of the excess pressure. In the particular example of FIG. 1, the discontinuous thread is substantially helical in shape and all of its segments 5 being intact, with only the special segment referenced 6 in FIGS. 1 and 2 that is furthest from the collar 4 being truncated. In the description below, this special segment 6 is not taken into account, the invention applying to segments 5 that are intact.

Figure 2:
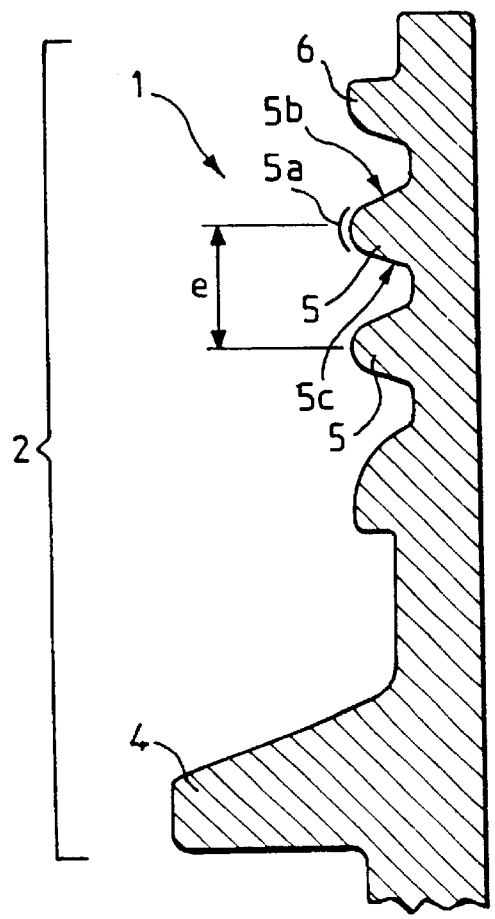
FIG. 2 is a longitudinal section view through the FIG. 1 parison on a longitudinal plane that contains the longitudinal central axis of the parison.
Figure 3:
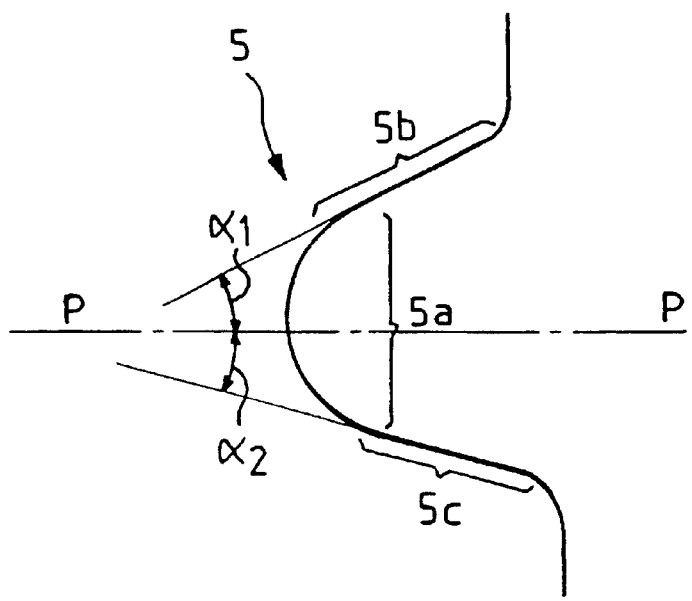
FIG. 3 is a simplified and enlarged diagram of the profile in longitudinal section of one of the segments of the thread of the FIG. 2 parison.

With reference now to FIG. 2, each segment 5 of the thread of the parison 1 has a special profile in longitudinal section constituted by a central portion 5a that forms substantially a circular arc, and two substantially rectilinear portions 5b and 5c referred to as the "flanks" of the thread. By convention, the flank 5b further from the portion 3 of the parison that is to form the body of the receptacle is referred to in the description below as the "top" flank, while the other flank 5c is referred to as the "bottom" flank. With reference to FIG. 3, the top and bottom flanks 5b and 5c of the thread are at respective angles $\alpha_1$ and $\alpha_2$ to the plane (PP) that extends transversely to the central longitudinal axis 1a of the parison. The particular type of discontinuous thread profile shown in the figures is characteristic of that which is commonly referred to as a neck of the Plastic Closure Only (PCO) type.

The parison 1 is made in conventional manner by injecting one or more thermoplastic resins into a mold. More particularly, in the context of the invention, the neck 2 of the parison is based on an aromatic polyester, i.e. it is constituted either by a single aromatic polyester resin, or else by a plurality of thermoplastic resins, at least one of which is an aromatic polyester resin, the resins being mixed either prior to injection or else being coinjected into the mold, sequentially and/or in parallel, so as to obtain a multi-layer parison.

Until now, in order to make parisons by injection, manufacturers have used a mold designed to obtain a thread having a profile in longitudinal section that is as symmetrical as possible. For a parison with a threaded neck of the PCO type, as shown in the figures, this looked-for symmetry means that on leaving the injection mold, the parison has flank angles $\alpha_1$ and $\alpha_2$ that are equal.

The invention goes against this technical prejudice by proposing, on the contrary, to make a thread at the parison stage which has a profile in longitudinal section which is deliberately asymmetrical, with the asymmetry being calculated in such a manner as to compensate as completely as possible for the deformation to which the thread profile will be subjected when the neck is subjected to a thermal stabilization operation of the kind described below. In the particular example shown in the figures, i.e. for a neck of the PCO type, this asymmetry gives rise to a difference in the magnitudes of the flank angles $\alpha_1$ and $\alpha_2$ the angle $\alpha_1$ of the top flank 5b being greater than the angle $\alpha_2$ of the bottom flank 5c of the thread.

Figure 4:
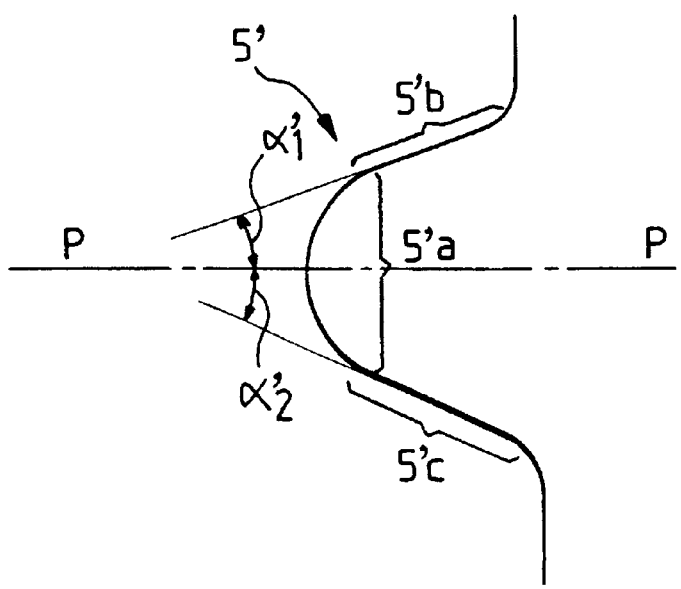
FIG. 4 is a diagram of the profile in longitudinal section of the FIG. 3 segment of thread, after the neck of the parison has been thermally stabilized.

FIG. 4 shows the profile in longitudinal section of a segment of thread 5' after the neck 2 has been subjected to a thermal stabilization operation, corresponding to a segment of thread 5 of the neck 2 prior to being subjected to the thermal stabilization operation. The difference in absolute value between the flank angles $\alpha'_1$ and $\alpha'_2$ of the top and bottom flanks 5'b and 5'c respectively of the thread 5' is smaller than the difference between the angles $\alpha_1$ and $\alpha_2$ of the same segment of thread 5 before thermal stabilization, and this means that the thread of the neck after thermal stabilization has a profile in longitudinal section that is more symmetrical. The angles $\alpha_1$ and $\alpha_1$ coming from injection of the parison are preferably designed so that after thermal stabilization the angles $\alpha'_1$ and $\alpha'_2$ are substantially equal, with a tolerance of no more than 1°.

In a specific embodiment, the parison is made by injecting a PET homo- or co-polymer resin, and the mold is designed in such a manner that the angles $\alpha_1$ and $\alpha_2$ of each segment 5 of the parison are equal respectively to 25° and to 15°. In a first step, an intermediate bottle is made in conventional manner by stretching and blowing at a temperature of about 100° C., the volume of said intermediate bottle being approximately one-and-a-half times the volume of the final bottle. The intermediate bottle is taken in line to an oven fitted with heating panels placed level with the body of the bottle, and with infrared lamps placed level with the neck of the bottle. In a first stage inside the oven, the intermediate bottle is subjected in the first few seconds to a reduction of volume of about 50%. During a second stage, the thermal stabilization operation takes place which consists in keeping the intermediate bottle at a high temperature, in practice a temperature greater than the crystallization temperature of the rein, and in doing so for a length of time that is sufficient to achieve a minimum degree of crystallinity. During the second stage of thermal stabilization, the amorphous PET resin is subjected to crystallization that makes it possible to ensure that the bottle is subsequently less easily deformable when subjected to temperatures below its crystallization temperature. This thermal stabilization operation is accompanied by the material in the neck becoming opaque and by the thread being deformed.

In a particular embodiment, the thermal stabilization operation is performed by keeping the bottle inside the oven at a temperature of 200° C. for a period of 30 seconds, and the degree of crystallinity of the resin in the neck 2, measured by means of a density column, is in the range 30% to 40%. In practice, the above degree of crystallinity means that the resin in the neck 2 is opaque throughout the thickness of the neck 2, and the neck is considered to be completely crystallized.

On leaving the oven, the intermediate bottle whose neck has been thermally stabilized is transferred in line to a second mold where it is blown again to obtain the final bottle. The bottle finally obtained has a thread on its neck in which the segments 5' have a profile in longitudinal section that is almost symmetrical, with the angles $\alpha'_1$ and $\alpha'_2$ being equal to within a tolerance of 1°. In other words, the difference in absolute value between the angles $\alpha'_1$ and $\alpha'_2$ is less than or equal to 1°. More particularly, when the angles $\alpha'_1$ and $\alpha'_2$ are respectively 25° and 15°, the angles $\alpha'_1$ and $\alpha'_2$ are in the best of cases both equal to 20° and in the worse of cases the angle $\alpha'_1$ can lie in the range 22° to 19°, while the angle $\alpha'_2$ is less than the angle $\alpha'_1$, but by no more than 1° for any given segment 5'. It should be observed that for a given bottle, the deformation of each initial segment 5 of the neck of the parison is not absolutely identical from one segment 5 to another.

Finally, the resulting bottle is well adapted to the closure caps that exist on the market, thus enabling it to be closed automatically to an optimum degree of sealing. In addition, since the neck of the bottle has been stabilized thermally, it can advantageously be washed or filled while hot with a liquid at a high temperature without the thread being subject to additional deformation that is sufficient for harming the sealed closure of the bottle. The resulting bottle can thus advantageously be used several times over after being washed in hot liquid, or indeed it can be used for packaging a pasteurized beverage while the beverage is still hot.

In the particular embodiment described above, the values of 25° and 15° respectively for the flank angles $\alpha_1$ and $\alpha_2$ are considered as being optimum values for a thread which, after the neck has been thermally stabilized, has flank angles $\alpha'_1$, and $\alpha'_2$ substantially equal to 20°. More generally, the difference in absolute value between the angles $\alpha'_1$ and $\alpha'_2$ lies advantageously in the range 5° to 20° and is preferably equal to 10°.

It has also been observed that once the neck 2 has been thermally stabilized, it is also the seat of deformation giving rise to a very small decrease in the pitch e of the thread, i.e., with reference to FIG. 2, the distance e between corresponding points on two adjacent segments 5 along the longitudinal central axis $1a$ is reduced. In order to further improve sealing of the bottle via its closure cap, it is therefore preferable for the pitch e of the thread in the initial parison to be very slightly too large, before the neck is thermally stabilized, so as to match the inside thread of the cap that is to be screwed onto the bottle. In practice, good results have been obtained by overdimensioning the pitch e of the initial parison, prior to thermal stabilization of the neck 2, by a value lying in the range 0.1 mm to 0.2 mm, compared with the pitch of the inside thread of the closure cap for the bottle.

The invention is not limited to using a PET homo- or co-polymer resin, but extends in general to using any resin based on saturated polyester for making the neck of the parison. In the context of the invention, the thermal stabilization operation can also be performed directly on the parison coming from the injection mold prior to the stretching and blowing operations. Under such circumstances, a parison is advantageously obtained whose neck has been thermally stabilized and which can subsequently be stretched and blown to form a receptacle. The thermal stabilization operation can also be performed on the final receptacle. The invention also applies to continuous threads and to any type of discontinuous thread without being limited to PCO type necks. In particular, it can be applied to necks for which the thread segments are of a profile in longitudinal section that is semicircular in shape.

What is claimed is:

1. Process of making a parison and comprising the following steps:

making a parison from one or more thermoplastic resins, said parison including a neck made of an aromatic polyester, said neck being provided with a thread that has not been thermally stabilized and that has an initial profile in longitudinal section that is asymmetrical; and thermally stabilizing at least the neck of the parison thereby obtaining a thread having a final profile in longitudinal section that is more symmetrical than said initial profile, wherein the initial profile of the thread includes a central portion, a top flank defining a flank angle $\alpha_1$ with a plane (PP) that extends transversely to a central longitudinal axis of the parison, and a bottom flank defining a flank angle $\alpha_2$ with the plane (PP), in that the final profile of the thread includes a central portion, a top flank defining a flank angle $\alpha'_1$ with a plane (PP) that extends transversally to a central longitudinal axis of the parison, and a bottom flank defining a flank angle $\alpha'_2$ with the plane (PP), and in that the difference in value between flank angle $\alpha'_1$ and flank angle $\alpha'_2$ is smaller than the difference in value between flank angle $\alpha_1$ and flank angle $\alpha_2$.

2. A process according to claim 1, characterized in that the difference in value between the flank angles $\alpha_1$ and $\alpha_2$ lies in the range of about 5° to 20°.

3. A process according to claim 2, characterized in that the flank angles $\alpha_1$ and $\alpha_2$ are respectively about 25° to 15°.

4. A process according to claim 2, characterized in that the difference in value between the flank angles $\alpha'_1$ and $\alpha'_2$ is about 10°.

5. A process according to claim 1, characterized in that the thread is discontinuous and is constituted by a succession of segments.

6. A process according to claim 1, characterized in that at least the neck is based on a PET homo- or co-polymer.

7. A process according to claim 1, wherein the pitch (e) of the thread on the neck of the parison which has not been thermally stabilized is over-dimensioned relative to the pitch of the thread of the parison after thermal stabilization.

8. A process according to claim 1, characterized in that at least the neck is completely crystallized.

9. A process according to claim 1, characterized in that the difference in value between the flank angles $\alpha'_1$ and $\alpha'_2$ of the final profile of the thread is less than or equal to about 1°.

10. A process according to claim 1, wherein at least the neck of the receptacle is based on a PET homo- or co-polymer.

11. A process according to claim 1, wherein at least the neck of the receptacle is completely crystallized.

12. Process of making a receptacle and comprising the following steps:

making a parison from one or more thermoplastic resins, said parison including a neck made of an aromatic polyester, said neck being provided with a thread that has not been thermally stabilized and that has a profile in longitudinal section that is asymmetrical; and making a receptacle from said parison, said receptacle having a neck which has been thermally stabilized thereby obtaining a thread with a profile in longitudinal section that is more symmetrical than the profile in longitudinal section of the thread of the parison, wherein the profile of the thread of the parison includes a central portion, a top flank defining a flank angle $\alpha_1$ with a plane (PP) that extends transversely to a central longitudinal axis of the parison, and a bottom flank defining a flank angle $\alpha_2$ with the plane (PP), wherein the profile of the thread of the receptacle includes a central portion, a top flank defining a flank angle $\alpha'_1$ with a plane (PP) that extends transversally to a central longitudinal axis of the parison, and a bottom flank defining a flank angle $\alpha'_2$ with the plane (PP), and in that the difference in value between flank angle $\alpha'_1$ and flank angle $\alpha'_2$ is smaller than the difference in value between flank angle $\alpha_1$ and flank angle $\alpha_2$.

13. A process according to claim 12, wherein the thread of the receptacle is discontinuous and is constituted by a succession of segments.

14. A process according to claim 12, wherein the difference in value between the flank angles $\alpha'_1$ and $\alpha'_2$ of the profile of the thread of the receptacle is less than or equal to about 1°.

15. A process according to claim 12, wherein the difference in value between the flank angles $\alpha'_1$ and $\alpha'_2$ is about 10°.

16. A process according to claim 12, wherein the pitch of the thread of the parison is over-dimensioned relative to the pitch of the thread of the receptacle.

* * * * *

UNITED STATES PATENT AND TRADEMARK OFFICE
CERTIFICATE OF CORRECTION

PATENT NO. : 6,635,325 B1
DATED : October 21, 2003
INVENTOR(S) : Roland Hebert

It is certified that error appears in the above-identified patent and that said Letters Patent is hereby corrected as shown below:

Column 3,
Line 64, "use" should be -- user --.

Column 4,
Line 62, "$\alpha_1$ and $\alpha_1$" should be -- $\alpha_1$ and $\alpha_2$ --.

Column 5,
Line 16, "rein" should be -- resin --.
Line 41, "$\alpha'_1$ and $\alpha'_2$" should be -- $\alpha_1$ and $\alpha_2$ --.

Column 6,
Lines 4-5, after "between" delete "corresponding points on"

Signed and Sealed this

Seventh Day of September, 2004

JON W. DUDAS
*Director of the United States Patent and Trademark Office*